US012641450B2

(12) United States Patent
Gonzalez et al.

(10) Patent No.: US 12,641,450 B2
(45) Date of Patent: May 26, 2026

(54) DYNAMICALLY IMPROVING MONITORING MISS RESOLUTION

(71) Applicant: T-Mobile Innovations LLC, Overland Park, KS (US)

(72) Inventors: Jose A. Gonzalez, Maitland, FL (US); Brian D. Lushear, Winter Springs, FL (US); Todd M. Szymanski, Winter Park, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 378 days.

(21) Appl. No.: 18/448,130

(22) Filed: Aug. 10, 2023

(65) Prior Publication Data

US 2025/0056259 A1     Feb. 13, 2025

(51) Int. Cl.
H04W 24/04          (2009.01)
H04W 8/30          (2009.01)

(52) U.S. Cl.
CPC ............. H04W 24/04 (2013.01); H04W 8/30 (2013.01)

(58) Field of Classification Search
CPC ........ H04W 24/04; H04W 8/30; H04W 24/08
See application file for complete search history.

(56) References Cited

U.S. PATENT DOCUMENTS

| | | | | |
|---|---|---|---|---|
| 2007/0006021 A1* | 1/2007 | Nicholson | ........... | G06F 12/0866 |
| | | | | 711/E12.019 |
| 2013/0329569 A1* | 12/2013 | Russell | ................. | H04L 41/069 |
| | | | | 370/242 |

| | | | | |
|---|---|---|---|---|
| 2015/0229661 A1* | 8/2015 | Balabine | ............. | H04L 63/1425 |
| | | | | 726/22 |
| 2017/0093672 A1* | 3/2017 | Zhao | ................... | H04L 43/0876 |
| 2018/0124097 A1* | 5/2018 | Tiwari | ............... | H04L 63/1425 |
| 2018/0152359 A1* | 5/2018 | Qian | ................. | H04L 41/5006 |
| 2023/0110983 A1* | 4/2023 | He | ...................... | H04L 41/0896 |
| | | | | 370/217 |
| 2023/0269153 A1* | 8/2023 | Yousouf | ............. | H04L 43/0811 |
| | | | | 709/224 |

FOREIGN PATENT DOCUMENTS

WO          WO-2007139542 A1 * 12/2007   ............. H04L 45/28

* cited by examiner

*Primary Examiner* — Yuwen Pan
*Assistant Examiner* — Swati Jain

(57)          ABSTRACT

A method for dynamically improving monitoring miss resolution comprises obtaining an incident report describing a monitoring miss, wherein the monitoring miss is associated with an outage in the communication system that has not yet been resolved, adding, by the incident reporting application, a flag to the incident report, wherein the flag indicates that the incident report is associated with one or more monitoring misses in the communication system that have not yet been resolved, extracting identification data identifying the outage in the communication system from the incident report, wherein the identification data comprises an identification of one or more network elements (NEs) at which the outage has occurred, and obtaining, based on the identification data, incident data describing a context of the outage in the communication system to identify a cause of the monitoring miss.

20 Claims, 10 Drawing Sheets

Report Error:

Incident Report
includes outage 220
and outage 222, but
only one outage 220
or 222 resolved

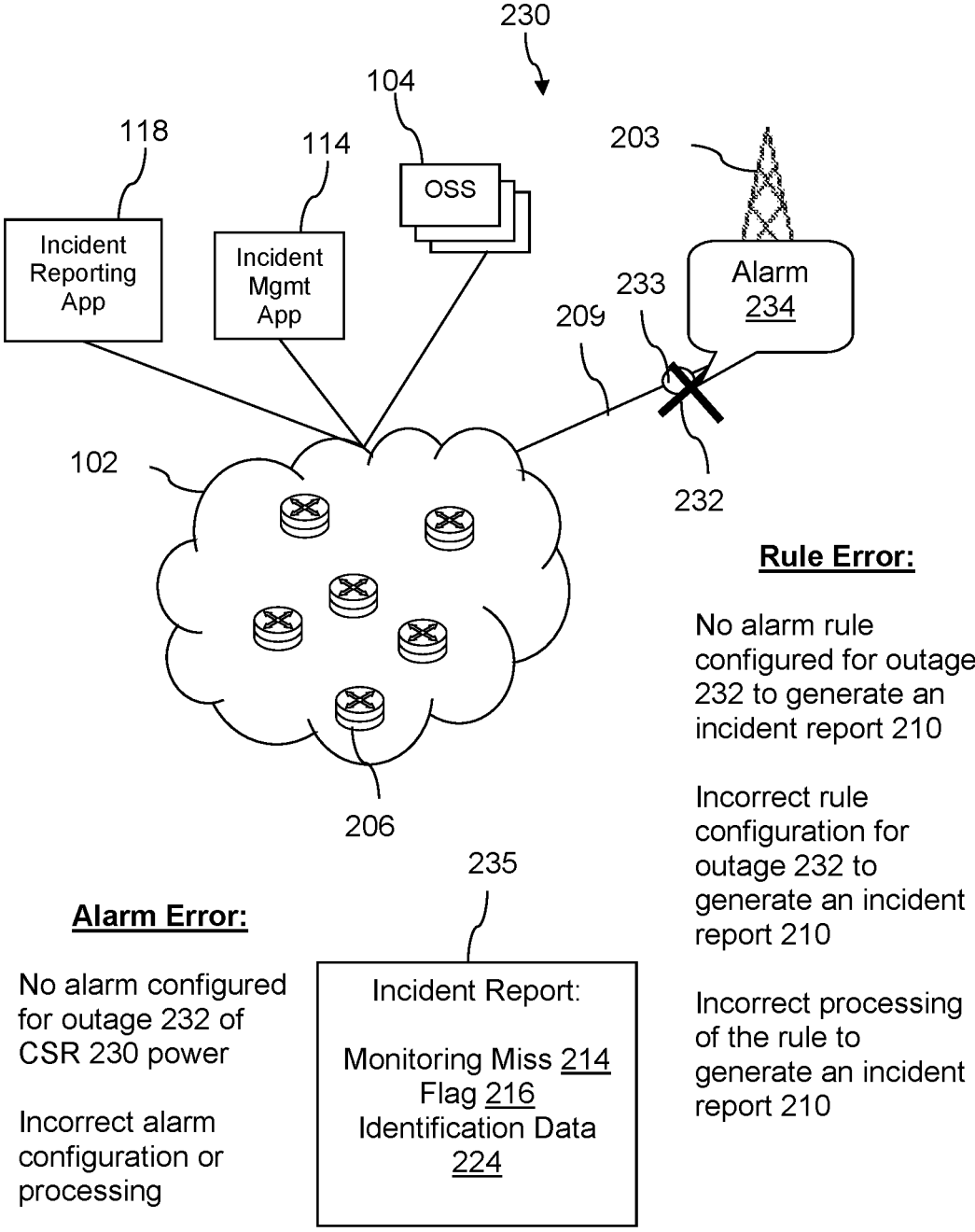

230

104

118

114

203

OSS

Incident Reporting App

Incident Mgmt App

Alarm 234

233

209

102

232

206

235

Alarm Error:

No alarm configured for outage 232 of CSR 230 power

Incorrect alarm configuration or processing

Incident Report:

Monitoring Miss 214
Flag 216
Identification Data 224

Rule Error:

No alarm rule configured for outage 232 to generate an incident report 210

Incorrect rule configuration for outage 232 to generate an incident report 210

Incorrect processing of the rule to generate an incident report 210

OSS

Incident
Reporting
App

Incident
Mgmt
App

252

209

102

Maintenance
State 253

Maintenance Error:

Incorrect operating
mode (maintenance
or normal) of the NE
(e.g., cell site 203),
suppressed alarm

254

206

Incident Report:

Monitoring Miss 214
Flag 216
Identification Data
224

260

104

262

OSS

203

264

209

265

102

System Error:

OSS outage 262 or
path to OSS outage
262, alarm not
processed by OSS to
trigger generation of
incident report 210

266        206

Incident Report:

Monitoring Miss 214
Flag 216
Identification Data
224

300

Begin

303 — Obtaining, by an incident reporting application executing on a computer system in the communication system, an incident report describing a monitoring miss based on at least one of a status of one or more network elements (NEs) at which an outage has occurred in the radio access network, prior incident reports associated with the one or more NEs, a record of alarms activated by the one or more NEs, or a maintenance history at the one or more NEs, wherein the monitoring miss is associated with the outage in the radio access network that has not yet been resolved.

306 — Adding, by an incident reporting application executing on a computer system in the communication system, a flag to an incident report describing a monitoring miss, wherein the flag indicates that the incident report is related to the monitoring miss.

309 — In response to determining that the incident report includes the flag, obtaining, by an incident management application executing on the computer system, from a data store communicatively coupled to the incident management application, an identification of one or more network elements (NEs) at which the outage has occurred and incident data describing the outage in the communication system, to identify a cause of the monitoring miss.

312 — Identifying, by the incident management application, a pattern of monitoring misses in a monitoring miss report, wherein the monitoring miss report indicates a plurality of monitoring misses and corresponding incident data indicating a cause of each of the monitoring misses, and wherein the monitoring misses may have occurred at a plurality of different NEs in the radio access network.

315 — Determining, by the incident management application, a single cause of the monitoring misses in the pattern of monitoring misses to obtain a single resolution plan, to prevent reoccurrence of each of the monitoring misses in the pattern of monitoring misses.

FIG. 3

End

400

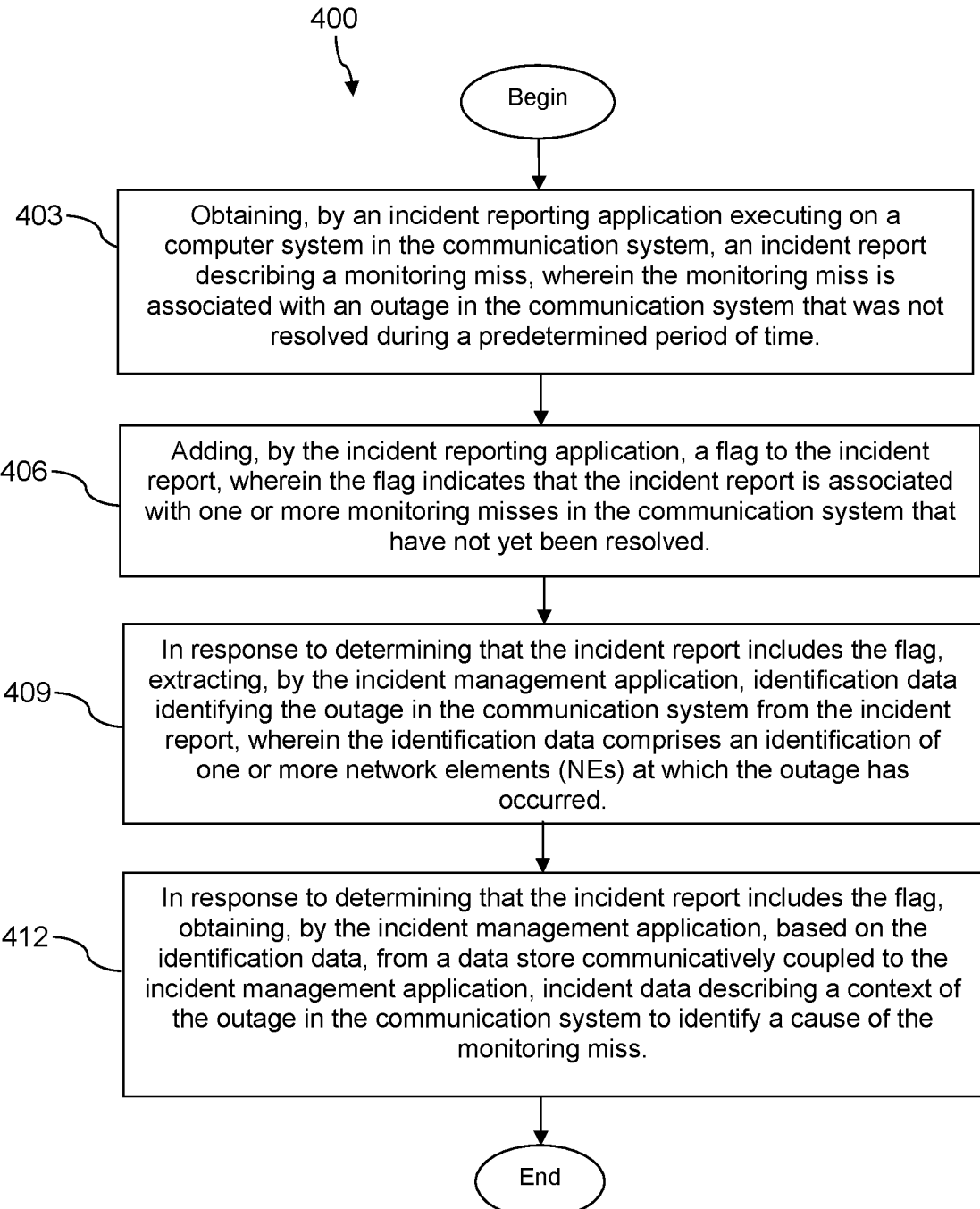

Begin

403 — Obtaining, by an incident reporting application executing on a computer system in the communication system, an incident report describing a monitoring miss, wherein the monitoring miss is associated with an outage in the communication system that was not resolved during a predetermined period of time.

406 — Adding, by the incident reporting application, a flag to the incident report, wherein the flag indicates that the incident report is associated with one or more monitoring misses in the communication system that have not yet been resolved.

409 — In response to determining that the incident report includes the flag, extracting, by the incident management application, identification data identifying the outage in the communication system from the incident report, wherein the identification data comprises an identification of one or more network elements (NEs) at which the outage has occurred.

412 — In response to determining that the incident report includes the flag, obtaining, by the incident management application, based on the identification data, from a data store communicatively coupled to the incident management application, incident data describing a context of the outage in the communication system to identify a cause of the monitoring miss.

End

FIG. 4

DYNAMICALLY IMPROVING MONITORING MISS RESOLUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method for dynamically improving monitoring miss resolution is disclosed. The method is implemented in a telecommunications carrier network comprising a radio access network. The method comprises obtaining, by an incident reporting application executing on a computer system in the communication system, an incident report describing a monitoring miss based on at least one of a status of one or more network elements (NEs) at which an outage has occurred in the radio access network, prior incident reports associated with the one or more NEs, a record of alarms activated by the one or more NEs, or a maintenance history at the one or more NEs. The monitoring miss is associated with the outage in the radio access network that has not yet been resolved. The method further comprises adding, by an incident reporting application executing on a computer system in the communication system, a flag to an incident report describing a monitoring miss, in which the flag indicates that the incident report is related to the monitoring miss. In response to determining that the incident report includes the flag, the method further comprises obtaining, by an incident management application executing on the computer system, from a data store communicatively coupled to the incident management application, an identification of the one or more NEs at which the outage has occurred and incident data describing the outage in the communication system, to identify a cause of the monitoring miss. The method further comprises identifying, by the incident management application, a pattern of monitoring misses in a monitoring miss report, wherein the monitoring miss report indicates a plurality of monitoring misses and corresponding incident data indicating a cause of each of the monitoring misses, and wherein the monitoring misses may have occurred at a plurality of different NEs in the radio access network, and determining, by the incident management application, a single cause of the monitoring misses in the pattern of monitoring misses to obtain a single resolution plan, to prevent reoccurrence of each of the monitoring misses in the pattern of monitoring misses.

In another embodiment, a telecommunication network management system is disclosed. The telecommunication network management system is implemented in a telecommunications carrier network comprising a radio access network and comprises an incident reporting application executing on a first computer system, and an incident management application that executes on a second computer system. The incident management application is configured to obtain an incident report describing a monitoring miss, wherein the monitoring miss is associated with an outage in the radio access network that has not yet been resolved, and add a flag to the incident report, wherein the flag indicates that the incident report is associated with one or more monitoring misses in the communication system that have not yet been resolved. The incident management application, when the incident report includes the flag, is configured to extract identification data identifying the outage in the communication system from the incident report, in which the identification data comprises an identification of one or more network elements (NEs) at which the outage has occurred, obtain, from a data store communicatively coupled to the incident management application, based on the identification data, incident data describing the outage and identifying a cause of the monitoring miss, and generate a resolution plan for future monitoring misses at different NEs in the radio access network based on the incident data of the monitoring miss, wherein the resolution plan comprises at least one of creating a new rule or amending an existing rule to configure the different NEs to generate an alarm when the cause of the monitoring miss is detected.

In yet another embodiment, a method for dynamically improving monitoring miss resolution in a telecommunications carrier network comprising a radio access network is disclosed. The method comprises obtaining, by an incident reporting application executing on a computer system in the communication system, an incident report describing a monitoring miss, in which the monitoring miss is associated with an outage in the communication system that has not yet been resolved. The method further comprises adding, by the incident reporting application, a flag to the incident report, in which the flag indicates that the incident report is associated with one or more monitoring misses in the communication system that have not yet been resolved. In response to determining that the incident report includes the flag, the method further comprises extracting, by an incident management application executing on the computer system, identification data identifying the outage in the communication system from the incident report, and obtaining, by the incident management application, based on the identification data, from a data store communicatively coupled to the incident management application, incident data describing a context of the outage in the communication system to identify a cause of the monitoring miss. The identification data comprises an identification of one or more network elements (NEs) at which the outage has occurred.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A-2D are illustrations of portions of the system of FIG. 1 according to an embodiment of the disclosure.

FIG. 3 is a flow chart of a method according to an embodiment of the disclosure.

FIG. 4 is a flow chart of another method according to an embodiment of the disclosure.

DETAILED DESCRIPTION

Figure 1:
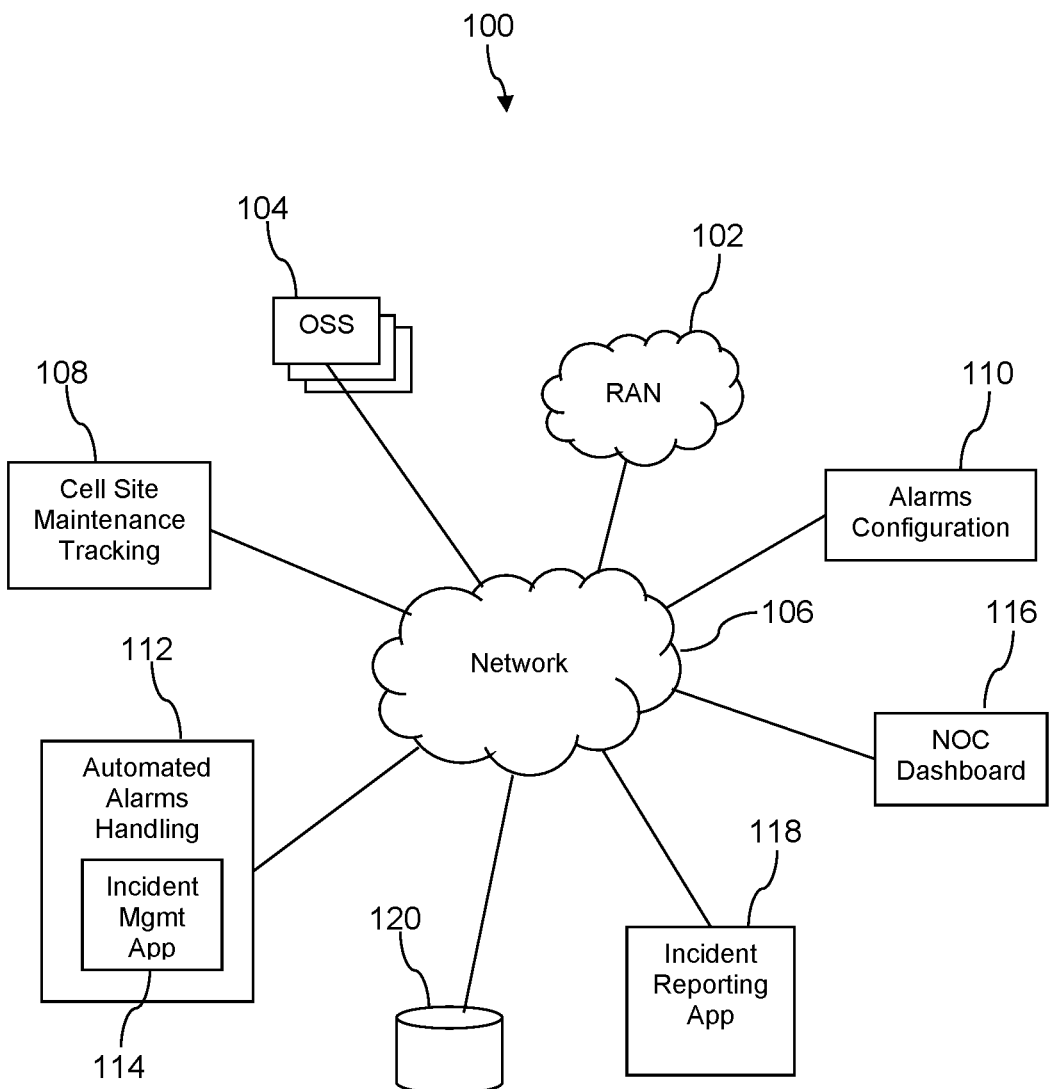
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network elements (NEs) in a radio access network (RAN) may be separated into regions or markets, for example, based on a location of the NEs. Regional groups may be responsible for managing the equipment within each of these regions, and regional groups may include personnel employed by the telecommunications service providing company operating the RAN. The regional groups may also be responsible for the guaranteeing functioning and operability of the NEs within a respective region. For example, regional groups may be awarded or recognized based on whether the NEs in the region are operating at a normal level. The malperformance of the NEs in the region may affect bonuses or performance reviews of the individual employees in the regional group.

Meanwhile, the actual physical functioning and operability of the NEs within the region may be managed by a central monitoring system, such as the NOC, of the telecommunications service providing company. For example, each of the NEs in the region may be subject to a variety of faults or failures, which result in raising of alarms which are picked up by OSSs. The alarms may be propagated upwards to the central monitoring station, and personnel at the central monitoring system may automatically or manually generate an incident report detailing an outage that caused the alarm. That is to say, the regional group does not really have full control of the functioning and operability of the NEs and other equipment in the region. Therefore, there is a mismatch between who is responsible for managing a region (e.g., regional group) and who actually manages the region (e.g., central monitoring system), which may result in various challenges.

One such challenge is when a monitoring miss event occurs at one or more NEs in the region. A monitoring miss event (sometimes also referred to herein as simply a "monitoring miss") may refer to a fault, to a failure, to an outage, and/or to a low performance event occurring at an NE in the network, which goes unresolved for a period of time, or which goes undetected by the alarm and incident reporting system disclosed herein. In some cases, the occurrence of a monitoring miss is a failure of the alarm and incident reporting system disclosed herein because the root cause of the monitoring miss may either not trigger an alarm for incident report creation or may simply not be detectable by the alarm and incident reporting system. When a monitoring miss occurs, the regional team may need to communicate with the NOC, operator, technician, or other personnel about the monitoring miss to develop a plan to not only fix the outage, but also prevent a similar monitoring miss from occurring again in the future. These communications may involve redundant monitoring and the sending of large amounts of data or spreadsheets back and forth to identify the root cause of the problem, correct the problem, and avoid similar problems going forward, thereby wasting valuable networking and processing resources. In this way, a monitoring miss may result in decreased network capacity, network availability and customer experience caused by the outages, and an increase in the consumption of network, power, and computing resources to work around the unresolved outages in the system.

The present disclosure teaches a technical solution to the foregoing technical problem related to network operations and maintenance using incident reports created specifically for these monitoring miss events, in which the incident report includes an indicator (e.g. flag) signaling that the incident report describes a monitoring miss. The monitoring miss may be associated with an outage in the communication system that was not resolved using the alarm and incident reporting system within a predefined period of time. The incident report may also indicate that the outage is being resolved or has been resolved, but that a root cause of the outage has not been addressed (e.g., this may be signaled by including the indicator for a monitoring miss in the incident report). In this way, the indicator in the incident report indicates that further processing is yet to be performed on the incident report since a monitoring miss is described therein.

In an embodiment, an incident reporting application may traverse all of the incident reports in the system periodically (e.g., according to a predetermined schedule) to identify the incident reports including the indicator associated with the monitoring miss. In another embodiment, the incident reporting application may obtain these incident reports in real time for further processing as the incident reports are received by the system. The incident reporting application may receive this incident report after the incident report was manually created by an individual or employee of the telecommunications service providing company. Alternatively, the incident reporting application may automatically generate the incident report based on various factors.

When the incident report is manually created, the regional group may first determine that an outage of an NE in the region has occurred when the NE is offline, fails to operate correctly, or fails to perform according to a threshold performance metric. When this outage has persisted for a period of time beyond that which is allowable by the alarm and incident reporting system, the regional group may determine that a possible monitoring miss may have occurred. For example, the regional group may determine that a cell site in the region is either unreachable or operating below capacity (e.g., below a minimum bandwidth or throughput level). The regional group may wait a period of time for this outage of the cell site to resolve using the alarm and incident reporting system. However, after a period of time when the outage has not yet been resolved or instructed to be resolved by the central monitoring system, the regional group may determine that the central monitoring system has either not detected this outage or failed to resolve this outage of the cell site, resulting in a monitoring miss.

The regional group may call upon the NOC, technician, troubleshooter, or other employed personnel to resolve this cell site outage. In doing so, the regional group or employed personnel may manually generate and upload an incident report indicating this outage and data describing the outage (e.g., location of cell site, equipment, outage duration, performance degradation details, cause of outage, etc.). Since the outage is already in the process of being resolved, the incident report may also indicate that the outage has been resolved with details on who is performing the outage fix and how the outage fix is performed. For example, the incident report may include a resolved indicator (e.g., flag or bit) indicating whether the outage has been resolved.

As mentioned above, the incident reporting application may alternatively generate the incident report automatically based on various factors. For example, the incident reporting application may generate the incident report for the monitoring miss based on the status of one or more NEs in the system. In some cases, the incident reporting application may periodically traverse a status data store, which may store up-to-date data regarding a status of each NE in the RAN (e.g., whether the NE is operating or not, whether the NE is operating according to the predetermined performance metric or not, etc.). For example, the status data store may include data regarding multiple cell sites in the RAN and an indication as to whether the cell site is online or offline. In this case, the incident reporting application may first determine whether there is an outage at the NE based on the status of the NE indicated in the status data store. When the NE is indicated as not operating properly (or not operating according to the predetermined performance metric), the incident reporting application may then determine whether an outstanding incident report regarding the NE is currently being processed (i.e., in the process of being resolved based on the outstanding incident report). If so, the incident reporting application may determine that the outage at the NE is not a monitoring miss since the system is working to resolve the outage. However, if the outage at the NE is not otherwise indicated in an outstanding incident report, the incident reporting application may determine that the outage at the NE is a monitoring miss because the outage may not otherwise have been detected by the system. In this case, the incident reporting application may automatically generate an incident report for the monitoring miss.

In another case, the incident reporting application may generate the incident report including details of the monitoring miss based on an analysis of prior incident reports (e.g., recent incident histories) within a period of time. In some cases, the prior incident reports may have been manually generated by a human. For example, the incident reporting application may traverse every single human generated incident report that has not already been flagged as indicating a monitoring miss to determine a reason behind the human generated nature of the incident report (i.e., why did the incident report need to be created by a human manually as opposed to generated by the system automatically). The incident reporting application may determine, based on the foregoing reason, whether these human generated incident reports correspond to monitoring misses based on whether the outage described in the human generated incident reports can be prevented in the future or not. For example, these human generated incident reports may include resolution codes that may correspond to whether the outage can be prevented in the future or not, and the incident reporting application may use the resolution codes to determine whether or not to create an incident report for a monitoring miss based on one or more of these human generated incident reports. For example, one human generated incident report may indicate a fiber cut in the RAN, and the incident reporting application may determine that this incident report does not correspond to a monitoring miss because such a fiber cut may not necessarily be prevented in the future by a preconfigured alarm and automated incident reporting scheme. However, another human generated incident report may indicate a lack of redundancies in a backhaul link between the cell site and the backhaul network. The incident reporting application may determine that this incident report indeed corresponds with a monitoring miss because such a lack of redundancies in the backhaul link may be prevented in the future by configuring an alarm and incident reporting scheme (e.g., a new rule, modified rule, or new alarm) for all future backhaul link redundancy failures.

The incident reporting application may also generate the incident report including details of the monitoring miss based on other factors as well, such as, for example, a record of alarms presents at the NE when the monitoring miss occurred, alarm rules configured for the NE, a maintenance history of the NE, etc. For example, the incident reporting application may gather data from various sources to determine a record of other alarms present/active at the NE when the monitoring miss is detected. In some cases, these other alarms or the root cause of these other alarms may shed light into the cause of the monitoring miss and one or more potential resolutions for the monitoring miss. Similarly, the incident reporting application may gather data regarding the alarm rules configured for an NE when a monitoring miss is detected at the NE. The alarm rules may indicate which types of faults, failures, outages, or performance deviations trigger an alarm at the NE, which may consequentially also indicate which types of faults, failures, outages, and performance deviations may not be programmed to trigger an alarm at the NE, thereby causing a monitoring miss. In this way, the alarm rules configured at an NE may help narrow down the possible root cause of a monitoring miss at an NE, and potentially help the NOC identify a solution to the monitoring miss.

Lastly, the incident reporting application may also gather data regarding a maintenance history of maintenance events or actions performed at an NE during or around the time of the monitoring miss. In some cases, a maintenance event that is service-impacting may result in alarms being turned off at the NE during a period of time when the maintenance technician is performing maintenance on the NE. The maintenance technician may need to turn the alarms back on at the NE after maintenance is complete to resume normal alarm functioning at the NE. However, for example, the maintenance technician may inadvertently forget to turn the alarms back on after completing maintenance on the NE when the NE is back online and providing connectivity services. In this case, any failures at the NE that should have triggered an alarm during this post-maintenance time may not actually result in the alarms being triggered since the alarms are still turned off. Therefore, the corresponding incident report may also not be created for the failure, resulting in a monitoring miss.

In either of these cases, the incident reporting application may add, to the incident report, an indicator (e.g., flag or bit) indicating that incident report carries information regarding a monitoring miss, as opposed to another type of outage already handled using the alarm system. The indicator may otherwise be manually added to the incident report when the incident report is manually created by an operator or other personnel employed by the telecommunications service providing company. The indicator may be a flag or a bit set to either 0 or 1 to indicate that the incident report includes details regarding a monitoring miss. For example, the indicator may be set to 1 when the incident report includes details regarding a monitoring miss. The indicator may be set manually by the personnel or automatically by the incident reporting application.

The incident report may include identification data identifying the outage corresponding to the monitoring miss in the communication system. For example, the data identifying the outage may be an identification or address of one or more NEs in the RAN at which the outage has occurred. An incident management application may obtain this identification data from the incident report, or this identification data may be manually added to the incident report when the incident report is manually created. This data may additionally or alternatively be stored in a data store coupled to and accessible by the incident reporting application.

The incident management application may also obtain incident data describing a context of the outage that caused the monitoring miss based on the identification data. The context of the outage may refer to various factors that may have caused the outage or affected the processing of the outage, any incident reports that may be associated with the NEs at which the outage occurred, any alarm or rule that may be associated with the outage, a lack of alarm or rule associated with the outage, a maintenance state of the NEs at which the outage occurred, any software or hardware updates performed anywhere in the system or in the RAN, or any other factor that may be related to the outage or the NEs at which the outage occurred. In this way, the incident data describing the context of the outage may include incident histories of the NEs at which the outage occurred over a predetermined period of time, a record of alarms received from the NEs at which the outage occurred, co-pending alarms active and being processed at the time that the outage occurred, a status of equipment at or near the NEs when the outage occurred, a maintenance history of the NEs, alarm rules or configurations associated with the NEs or the outage, etc. The incident histories may include a history of prior incident reports created for the NEs. The record of alarms may include a history of prior alarms received from the NEs, but not necessarily processed into incident reports. The co-pending alarms may include alarms that were being sent by the NEs to the OSS during the outage, which as mentioned above, may not have been resolved until the monitoring miss was discovered. The status of the equipment may include other equipment at or near the NEs that couple to or communicate with the NEs during the outage. The rules may refer to specific alarm rules created for the NEs, for example, for specific types of outages that may occur at the NEs (e.g., path failures, cell site unreachable, power failures, etc.).

The incident management application may receive this incident data by querying a data store with the identification data, in which the data store may maintain this contextual data in association with all outages, alarms, and/or incident reports in the communication system. The data store may store the contextual data in association with the identification data of the NEs at which the outage occurred and return the contextual data to the incident management application upon request. The incident management application may otherwise receive the incident data from the NEs, the central monitoring system, the NOC, or another entity in the communication system that may keep track of the foregoing contextual data.

In either case, the incident management application may analyze the incident data to identify a cause of the monitoring miss and prevent the monitoring miss from occurring again without resolution. The incident management application may use the incident data to first determine the type or class of monitoring miss, which may be used to identify the cause of the monitoring miss. The different types of monitoring misses may include report errors, alarm errors, rule errors, maintenance errors, system errors, data integrity errors, as further described herein.

A report error may occur when an incident report has been created for at least two outages, but the central monitoring system only processed and instructed resolution of one of the outages included in the incident report. In this case, the incident report may be marked as resolved even though all the incidents in the report have not truly been resolved, resulting in a monitoring miss for at least one of these outages. The incident data may include the incident report detailing the at least two outages, and the incident management application may determine that one of these at least two outages correspond to the outage that caused the monitoring miss. In this way, the instruction management application may determine the cause of the monitoring miss based on the report error (i.e., type of monitoring miss).

An alarm error may occur when an NE is not configured to generate and send an alarm based on a particular type of outage being detected. For example, a router in the RAN may not yet be configured to generate and send an alarm to the OSS when a port on the router is down, even though the failure of the port results in packet loss and thus, the outage. Since an alarm is not generated for this outage, an incident report is also not generated for this outage, resulting in a monitoring miss that is only detected after a period of time by the regional team. An alarm error may also occur when an alarm is configured at the NE incorrectly. In other words, the NE may be equipped with faulty instructions to generate and send an alarm based on the detection of certain outage conditions, which may result in the outage condition not actually being detected and the alarm not being sent to the OSS, and thus the occurrence of a monitoring miss. In either of these cases, the incident data may include details regarding alarms configured at the NE and the outages that trigger the alarms. In this way, the instruction management application may determine the cause of the monitoring miss based on details of the alarms included in the incident data.

A rule error may occur when the system is not configured to generate an incident report based on a received alarm. For example, the NE may be configured to generate and send an alarm to the OSS when an outage occurs, but a rule may not be configured for that alarm to trigger generation of an incident report, resulting in a monitoring miss. A rule error may also occur when an alarm rule is incorrectly configured for automated generation of an incident report. For example, a rule may have an unreasonably large delay in processing between reception of the alarm and generation of the incident report. The rule may also have been configured incorrectly due to faulty instructions for the automated generation of the incident report. Any of these situations may result in a failure to generate an incident report based on the alarm or an unnecessarily large delay in generating the incident report, which then leads to the outage at the RAN, and thus a monitoring miss. The incident data may include details regarding the rules programmed for all alarms configured across the NEs in the RAN. In this way, the instruction management application may determine the cause of the monitoring miss based on details of the rules included in the incident data.

A maintenance error may occur when, for example, a technician inadvertently leaves the NE in a maintenance state (or other offline state) in which alarms are not processed or not sent to the OSS, but the regional team still expects the NE to be functioning normally to forward traffic at an optimized rate. In this case, the NE may simply be in a state of ignoring outages and alarms since the NE is set in an offline state for maintenance, meanwhile traffic may continue to be forwarded through the NE under the expectation of a normal functioning NE. Since the NE is not processing or sending alarms (e.g., suppressed alarms in the maintenance state), the outage at the NE results in a monitoring miss that is not detected or resolved until the regional team manually identifies the incorrect state of the NE. The incident data may indicate the status of each of the NEs in the RAN. In this way, the instruction management application may determine the cause of the monitoring miss based on status of the NEs included in the incident data.

A system error may occur when one or more components of the system that are not typically configured with alarms have failed or are otherwise not functioning properly per a performance metric. For example, the OSS may simply have failed, and the OSS may not be configured with an alarm to signal that an outage has occurred at the OSS. Similarly, a path between the NE and the OSS may have failed (e.g., a link or node on the path may have crashed). The links and nodes on the path may also not be configured with alarms to signal the failure. Similarly, software updates may have caused changes to the programming of the alarm and incident reporting system that have not been updated, thus leading to the faulty function of the system. When any of these types of failures occur, the alarms may not be sent to the OSS for processing or generation of an incident report, thus resulting in a monitoring miss. The incident data may indicate the status of the OSSs, the pathways to the OSS, and any software or hardware updates performed on the system components. In this way, the instruction management application may determine the cause of the monitoring miss based on status of the system components included in the incident data.

A data integrity error may occur when the incident management system receives an alarm and attempts to search for data regarding the NE at which the alarm occurred to create the incident report. However, the search performed by the incident management application may have failed due to, for example, bad data or upstream system unavailability. Since the incident management application may not be able to process this received alarm, the alarm may result in a monitoring miss that is not detected or resolved until the regional team manually identifies the cause of the alarm at the NE. The incident data may indicate the status of the NE that caused the alarm, details regarding the alarm (e.g., time of alarm, location of alarm, etc.), and any other data that the incident management application is capable of obtaining with regard to the alarm. In this way, the instruction management application may determine the cause of the monitoring miss based on the incident data. In some cases, the incident reporting application may manually generate an incident report to track the outage, such that the root cause may only be determined when the data integrity issues are resolved.

In this way, the incident management application may use the incident data to identify a cause of the monitoring miss based on a type of the monitoring miss. Once the cause is identified, the incident management application, central monitoring system, NOC, and/or regional team may develop a resolution plan based on the cause of the monitoring miss. The resolution plan may be to configure/re-configure an alarm at an NE, configure/re-configure a rule for an alarm, communicate with an employee or personnel regarding a change to standard procedure, etc. For example, the incident management application may generate automated responses to certain monitoring misses identified in the incident reports, in which the automated responses may include pre-defined resolution plans for specific types of monitoring misses. The resolution plans may be automatically carried out for subsequent detections of similar monitoring misses in incident reports. The resolution plan may be to create a new alarm for an NE to send when another outage is detected, to create a new rule for an existing alarm to trigger creation of an incident report for another similar outage, or amending a current rule to trigger creation of an incident report for another similar outage. As another example, when the type of the monitoring miss is a report error, the incident report in question may be analyzed to determine the personnel that processed the incident report, and a message to that personnel may be issued to prevent future occurrences of incident report processing errors. Similarly, when the type of monitoring miss is a maintenance error, the incident management application, central monitoring system, NOC, and/or regional team may develop a resolution plan to confirm the maintenance status of an NE within a period of time after maintenance is performed. In some cases, the incident management application may even automatically generate incident reports for monitoring misses as a resolution plan based on the corresponding incident data to facilitate more accurate incident report creation. In this way, the resolution plan may be implemented to prevent such monitoring misses from occurring again in the communication system or reducing the likelihood of reoccurrences of the monitoring miss.

In some cases, the incident report including the indicator of a monitoring miss may be added to a monitoring miss report, which may include data from multiple incident reports received over a predetermined window of time. Each of the incident reports described in the monitoring miss report may also include the indicator indicating that the incident report describes a monitoring miss. The incident management application may identify a pattern of monitoring misses in the monitoring miss report based on various factors, such as, for example, a location of each of the monitoring misses, NEs involved in each of the monitoring misses, a vendor associated with each of the monitoring misses, an OSS associated with each of the monitoring misses, etc. This correlation between monitoring misses may also be aggregated to a time window that represents a type of failure for a period of time. For example, a particular system which provides enrichment may be offline, thereby affecting incidents during that time window, and causing one or more monitoring misses. This pattern may indicate that a single cause may be responsible for multiple monitoring misses, and thus a single resolution plan may be determined to prevent reoccurrence of each of the monitoring misses in the pattern of monitoring misses. For example, multiple monitoring misses may have occurred at various cell sites operated by a single OSS, and the monitoring miss report may indicate that these monitoring misses are caused by a software update performed at the OSS. The incident management application may determine that updating the system rules and alarms as necessary to account for the software update to the OSS, or reversing the software update to the OSS, may be a suitable resolution plan for the multiple monitoring misses, thereby preventing future outages at the cell sites operated by the OSS. In some cases, the incident management application may traverse the monitoring miss report periodically according to a predetermined schedule to identify a pattern of monitoring misses that occurred within a window of time and that is resolvable with a single resolution plan.

In this way, the embodiments disclosed herein prevent future outages in the network by strategically and automatically identifying monitoring miss events that occurred in the system. The embodiments limit the amount of unnecessary data processing and transmission typically required in finding monitoring misses, which often results in tedious and redundant processing tasks. Therefore, the embodiments disclosed herein increase network capacity, network availability, and customer experience by decreasing future outages of the system, and decrease the consumption of network, power, and computing resources in the prevention of future outages of the system.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system (or application) 118, and a data store 120. In an embodiment, communication system 100 may be a telecommunications carrier networking comprising the RAN 102.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router (CSR) that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report, as described herein.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

In an embodiment, the incident reporting application 118 and the incident management application 114 may operate together to dynamically improve monitoring miss resolution in the communication system 100, as described herein. The incident reporting application 118 may obtain (e.g., automatically generate or receive) an incident report describing a monitoring miss. The monitoring miss may be associated with an outage in the communication system 100 that was not resolved using the alarm and incident reporting system within a predefined period of time. The period of time may be any period of time within which the regional team may expect a resolution to the outage, such as, for example, a few minutes (e.g., 10 minutes), several hours (e.g., 12 hours), or even days (e.g., 1 week). The incident reporting application 118 may automatically generate the incident report, or the incident reporting application 118 may receive the incident report after personnel in the regional team manually generates the incident report.

The incident reporting application 118 may add a flag or indicator to the incident report, in which the flag indicates that the incident report is related to or describes a monitoring miss (as opposed to being related to an alarm received from an NE in the RAN 102). The incident reporting application 118 may also add a flag or other indicator indicating that the outage behind the monitoring miss is currently being resolved or has been resolved, since the incident report is created presumably at the time that the regional team initiates resolution of the outage. Both of these flags or indicators may be added manually by the personnel of the regional team when manually creating the incident report as well. In some cases, the incident report may be closed since the outage behind the monitoring miss is being resolved/has been resolved, but the indicator signals that the incident report may require further processing.

The incident reporting application 118 may add details regarding the monitoring miss to a monitoring miss report, which may include data regarding multiple monitoring miss events that occurred in the system 100 over a window of time. The incident management application 114 may periodically traverse the monitoring miss report to identify patterns or trends in the monitoring misses, which may be resolved using a single or a small number of resolution plans, to prevent such monitoring misses from occurring in the future (or reduce the possibility of such monitoring misses from occurring in the future).

The incident management application 114 may determine that an incident report relates to a monitoring miss when the incident report includes the indicator indicating that the incident report describes a monitoring miss. When this indicator is included in the incident report, the incident management application 114 may be triggered to perform various methods to process the incident report accordingly. First, the incident management application 114 may obtain an identification of the NE(s) at which the outage described in the incident report occurred. The identification of the NE may be an address or identifier of the NE involved in the outage. Then, the incident management application 114 may obtain the incident data describing the context of the outage in the communication system 100, to identify a cause of the monitoring miss and prevent or reduce the likelihood of occurrence of similar monitoring misses in the future.

Turning now to FIGS. 2A-2D, shown are portions of the communication system 100 in which various types of monitoring misses have occurred according to different embodiments of the disclosure. The different types of monitoring misses and the determination of a root cause behind the different types of monitoring misses is further described below with references to FIGS. 2A-2D.

Figure 2A:
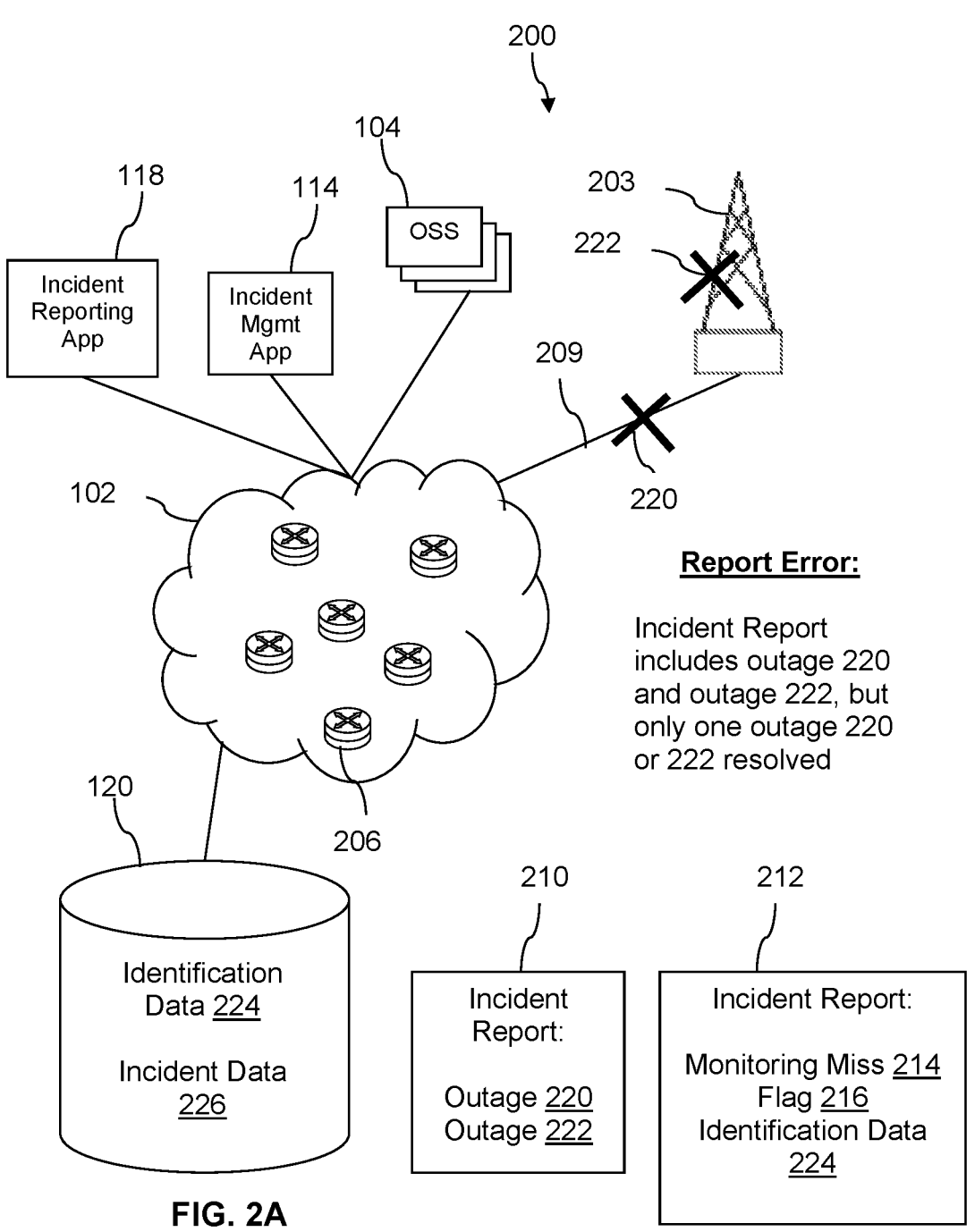

Specifically referring now to FIG. 2A, shown is a portion 200 of the communication system 100, including RAN 102, OSS 104, data store 120, a cell site 203, and one or more backhaul links 209 coupling the cell site 203 with the RAN 102. The RAN 102 may further include one or more NEs 206, which may be other cell sites, routers, bridges, switches, virtual networks (VN), gateways, fibers, wired and wireless links, and/or any other type of network device. While cell site 203 is shown as separate from the RAN 102, the cell site 203 may be considered part of the RAN 102 operated by a telecommunications service provider. The one or more backhaul links 209 may be paths through another network, such as, for example, an alternative access vendor network. The path of the backhaul links 209 may be wired or wireless, and may include multiple NEs and links interconnecting to create the path. For example, the path of the backhaul links 209 may include one or more fibers or may include one or more virtual local area networks (VLANs). While only one backhaul link 209 is shown in FIG. 2A, ideally multiple redundant and diverse backhaul links 209 should be present to connect the RAN 102 to the cell site 203, in which each backhaul link 209 flows through a different path. In this way, when one backhaul link 209 fails, another backhaul link 209 may be available to reach the cell site 203.

In particular, FIG. 2A shows an example report error, in which two outages 220 (indicated by an "X" mark in FIG. 2A) and 222 have occurred in the portion 200 of the communication system 200. The outage 220 shows that a failure has occurred on the backhaul link 209. For example, a failure may have occurred at one backhaul link 209 and other redundant backhaul links 209 may have not been configured to the cell site 203. The other outage 222 may be a failure that occurred at the cell site 203, such as, for example, a power failure or equipment failure. Both outages 220 and 222 may trigger alarms to be sent from the cell site 203 and/or other NEs on the backhaul link 209 up to the OSS 104 to be stored at the data store 120.

The incident reporting application 118, or personnel at the NOC, may have created the incident report 210 describing both outages 220 and 222 and the reason or cause behind the outages (i.e., failure of the backhaul link 209 and failure at the cell site 222, respectively). However, the central monitoring system or NOC may have only processed and been instructed to resolve one of these outages 220 or 222 included in the incident report 210. This may be because the operator responsible for reviewing and processing the incident report 210 may have inadvertently closed the incident report 210 and marked the incident report 210 as having been resolved after resolving outage 220, but forgotten to process the second outage 222 (or vice versa). In either case, this operator error at the NOC results in one of these outages 220 or 222 persisting, causing a failure in the system 100, packet loss, and network unavailability.

When the regional team responsible for managing this portion 200 of the system 100 identifies that one of these outages 220 or 222 still persists, the regional team may initiate resolving the persisting outage 220 or 222, and issue another incident report 212 either manually or automatically using the incident reporting application 118. The incident report 212 may indicate details about this monitoring miss 214 regarding the persisting outage 220 or 222, and may include a flag 216 indicating that this incident report 212 describes a monitoring miss 214. The incident report 212 may also include another flag indicating that the outage 220 or 222 behind this monitoring miss 214 is in the process of being resolved or has been resolved, but the root cause of this monitoring miss 214 (i.e., operator error) still needs to be addressed by the NOC. The incident report 212 may also include identification data 224 identifying the backhaul link 209 and/or the cell site 203 depending on the outage 220 or 222 being described in the incident report 212. The identification data 224 may be an identifier or address of the NE (i.e., backhaul link 209 and/or the cell site 203) at which the outage 220 or 222 has occurred. As shown in FIG. 2A, the data store 120 may also store the identification data 224 in association with incident data 226, which as described above describes a context of the outage 220 or 222 at the NE.

The incident management application 114 may obtain the identification data 224 from the incident report 212 about the monitoring miss 214, and then use the identification data 224 to obtain incident data 226 about the outage 220 or 222 or the monitoring miss 214, for example, from the data store 120. The incident data 226 may include the relevant data used to determine the type of monitoring miss 214, which in this case is a report error. The incident management application 114 may then use the type of the monitoring miss 214 to determine the cause of the monitoring miss 214, which may then be analyzed for prevention of future similar monitoring misses. In this case, the incident data 226 may include the incident report 210 and identify the NOC personnel that processed the initial incident report 210 that was incorrectly processed. A message or instruction may then be sent to this NOC personnel regarding this operator error with a recommendation to ensure complete review of all incident reports 210 prior to closing the incident report 210 going forward.

Referring now to FIG. 2B, shown is a portion 230 of the communication system 100, including similar components as the portion 200 of FIG. 2A, except that FIG. 2B includes a cell site router 233 positioned at the base of the cell site 203. In addition, FIG. 2B does not explicitly show the data store 120. Nevertheless, it should be appreciated that the portion 230 of the communication system 100 indeed includes the data store 120.

In particular, FIG. 2B shows an example rule error based on an outage 232 (indicated by an "X" mark in FIG. 2B), or failure, occurring at the cell site router 233. When the outage 232 at the cell site router 233 triggers the generation and sending of an alarm 234 to the OSS 104, a rule error may occur. A rule error may occur when the system is not configured to generate an incident report 210 based on a received alarm 234 because a rule may not yet be configured for that particular outage 232 at that particular type of NE (i.e., a cell site router 233). Another type of rule error may occur when there is indeed a rule configured for the outage 232 at the cell site router 233, but the rule is programmed incorrectly (e.g., the incident report 210 may not be triggered to generate correctly, too large of a delay programmed between receiving the alarm 234 and generating the incident report 210, etc.). Yet another type of rule error may occur when there is indeed a rule configured for the outage 232 at the cell site router 233, and the rule is programmed correctly, however an application or individual at the NOC may not process the rule correctly to generate an accurate incident report 210 in a timely manner.

FIG. 2B also shows an example alarm error based on the outage 232 occurring at the cell site router 233. An alarm rule error may occur when the NE (i.e., the cell site router 233) is not configured to generate an alarm 234 when the outage 232 is detected because the NE may not be configured or programmed to trigger generation of the alarm 234 based on detection of the outage 232. Another type of alarm error may occur when the NE is indeed configured to generate and send an alarm 234 based on detection of the outage 232 at the cell site router 233, but the alarm is configured incorrectly (e.g., the alarm 234 does not trigger the presentation of any related information on the NOC dashboard 116 for resolution, etc.). Yet another type alarm rule error may occur when the NE is indeed configured to generate and send an alarm 234 based on detection of the outage 232 at the cell site router 233, and the alarm 234 is configured correctly, however an application or individual at the NOC may not process the alarm 234 correctly to generate an accurate incident report 235 in a timely manner.

Whether an alarm error or a rule error is present in the portion 230 of the system 200, it may take some time for the regional team responsible for managing this portion 230 of the system 200 to determine that a monitoring miss 214 has occurred due to the alarm error or rule error. Once the regional team identifies the monitoring miss 214, the regional team may resolve the outage 232, and issue another incident report 235 either manually or automatically using the incident reporting application 118. The incident report 235 may be similar to incident report 212 in that it describes a monitoring miss 214 (specifically, the monitoring miss 214 of the outage 232), a flag 216 indicating that this incident report 235 describes a monitoring miss 214, and identification data 224 identifying the cell site router 233 at which the outage 232 occurred. As should be appreciated, the incident report 235 may include other data not otherwise specified herein.

The incident management application 114 may obtain the identification data 224 from the incident report 212 about the monitoring miss 214, and then use the identification data 224 to obtain incident data 226 about the outage 232 or the monitoring miss 214, for example, from the data store 120. In this case, the incident data 226 may identify whether there is a rule configured for this outage 232, whether the rule is configured incorrectly, whether the rule is processed incorrectly, whether an alarm 234 is configured for this outage 232, whether the alarm is configured incorrectly, whether the alarm 234 was processed incorrectly and by whom, etc. A message or instruction may then be sent to the NOC or the central monitoring system to configure a rule, amend the rule, configure an alarm, correct an alarm, or send a message/recommendation to individual(s) regarding incorrect processing of the rule/alarm.

Figure 2C:
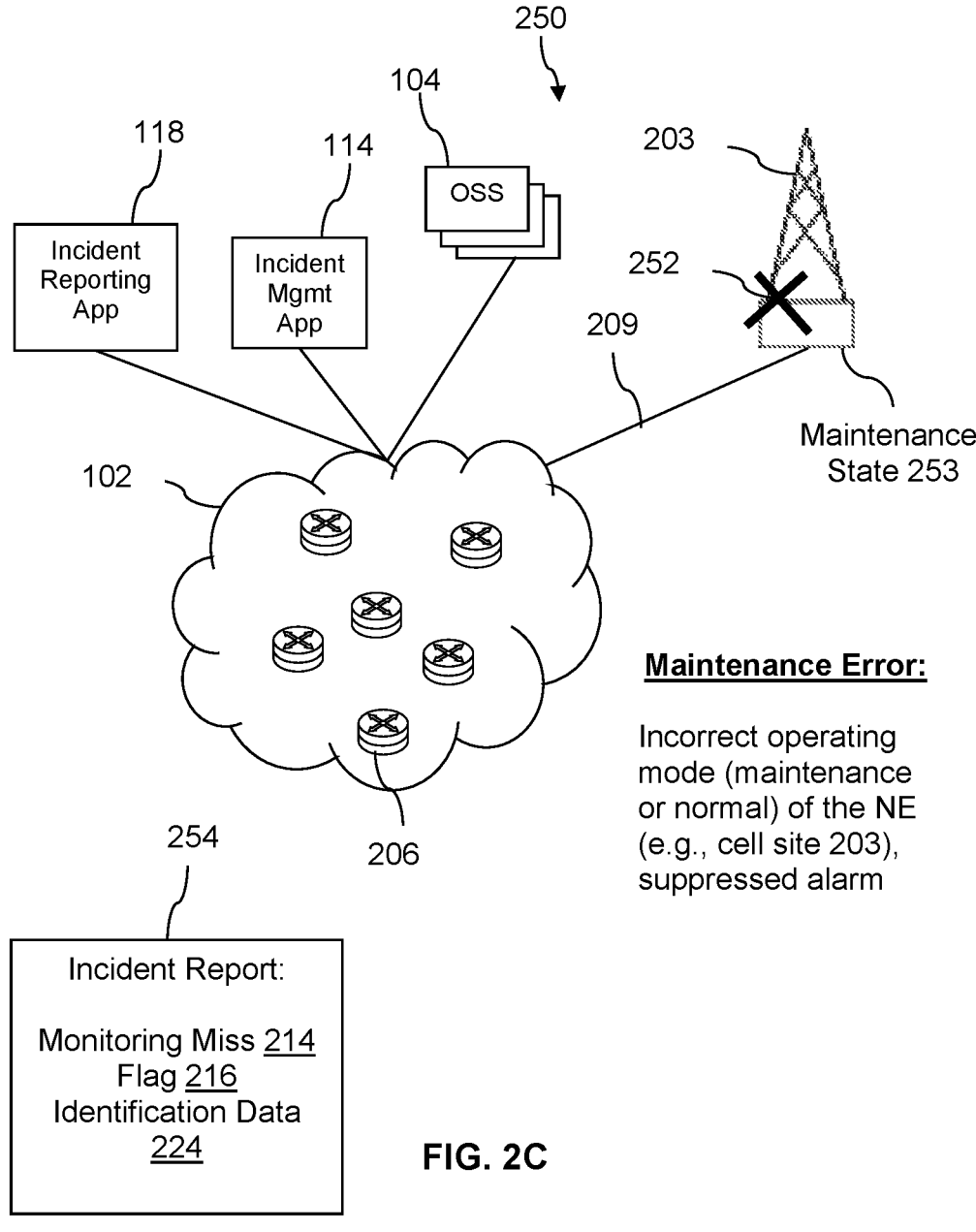

Referring now to FIG. 2C, shown is a portion 250 of the communication system 100, including similar components as the portion 200 of FIG. 2A, except that FIG. 2C does not explicitly show the data store 120. Nevertheless, it should be appreciated that the portion 250 of the communication system 100 indeed includes the data store 120.

In particular, FIG. 2C shows an example maintenance error based on an incorrect maintenance state 253 of the cell site 203. A maintenance error may occur when, for example, a technician inadvertently leaves the NE (e.g., cell site 203) in a maintenance state (or offline state) in which the NE is offline for maintenance even after maintenance has completed at the NE. When the NE is in the maintenance state, alarms may be suppressed, or not processed/sent to the OSS 104, since typically the NE would be offline at the time of maintenance. However, when the NE is in an incorrect state of maintenance, the regional team may be unaware of the incorrect state of maintenance at the NE, and thus may expect the NE to be functioning normally to forward traffic at an optimized rate. In the example shown in FIG. 2C, since the cell site 203 is not processing and sending alarms, the incorrect maintenance state 253 of the cell site 203 may itself be deemed a monitoring miss 214. In addition, any type of outage 252 (indicated by an "X" mark in FIG. 2C) that occurs at the cell site 203 when the cell site 203 is in the maintenance state 253 may also result in a monitoring miss 214, even if an alarm 234 was actually generated by the cell site 203, since the alarm 234 may not actually be sent to the OSS 104 when the cell site 203 is in the maintenance state 253. In this way, an incorrect maintenance state 253 of the cell site 203 may result in a monitoring miss 214 that is not detected or resolved until the regional team manually identifies the incorrect maintenance state 253 of the cell site 203.

Once this monitoring miss 214 is identified, the incident reporting application 118 may be triggered to generate the incident report 254, which may be similar to the incident report 212 and 235, except that the identification data 224 identifies the cell site 203 in the incorrect maintenance state 253. Personnel of the regional team may also generate the incident report 254 manually.

The incident management application 114 may obtain the identification data 224 from the incident report 254 about the monitoring miss 214, and then use the identification data 224 to obtain incident data 226 about the outage 232 or the monitoring miss 214, for example, from the data store 120. In this case, the incident data 226 may identify the current maintenance state 253 of the cell site 203, a duration of time during which the maintenance state 253 has indicated that the cell site 203 is offline and allegedly in maintenance, other alarms 234 generated by the cell site 203 during this duration, an identification of the technician who performed maintenance on the cell site 203 but forgot to reset the maintenance state 253 of the cell site 203, etc. A message or instruction may then be sent to the NOC or the central monitoring system to configure a rule to avoid such maintenance state 253 errors or send a message/recommendation to the technician regarding the failure to reset the maintenance state 253 of the cell site 203 and suggest preventative measures going forward.

Figure 2D:
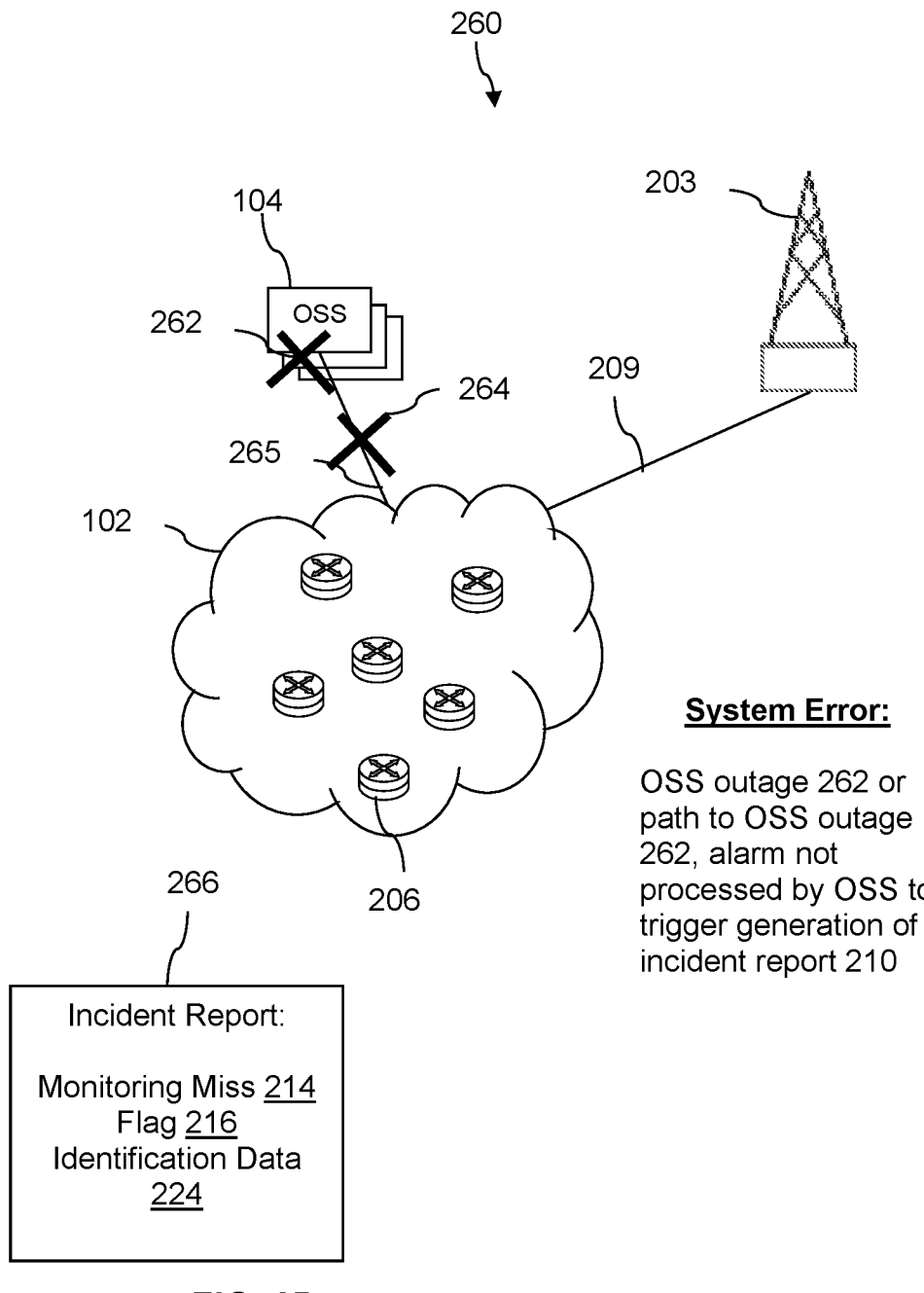

Referring now to FIG. 2D, shown is a portion 260 of the communication system 100, including similar components as the portion 200 of FIG. 2A, except that FIG. 2D does not explicitly show the data store 120, the incident reporting application 118, and the incident management application 114. Nevertheless, it should be appreciated that the portion 250 of the communication system 100 indeed includes the data store 120, the incident reporting application 118, and the incident management application 114.

In particular, FIG. 2D shows an example system error based on outage 262 or 264 of a component or communication pathway that functions to implement the alarm and incident report generation system described herein. A system error may occur when one or more components of the system that are not typically configured with alarms have failed or are not functioning optimally per a performance metric. For example, as shown in FIG. 2D, outage 262 may be a failure at the OSS 104 caused by a software update, which is problematic since the OSS 104 may be partially responsible for processing alarms 234 received by NEs in the system 100. Outage 264 may be a failure of a communication path 265 connecting one of the NEs 206 in the RAN 102 to the OSS 104. The communication path 265 may include one or more links or nodes between the NE 206 and the OSS 104, and this communication path 265 may be critical to the functioning of the alarm and incident report generation system described herein. In this way, both the outages 262 and 264 may result in a system failure when the OSS 104 and any of the nodes or links on the communication path 265 is not configured to generate and send any alarms 234 to signal the outages 262 and 264 to the NOC. Moreover, when the OSS 104 or the communication path 265 fails (i.e., when the outages 262 or 264 occur), any alarms present in the system 100 that are trying to reach the OSS 104 may be dropped due to the failure of the OSS 104 or a failure to reach the OSS 104. Therefore, such a system error is desirably prevented in the system 100 since such an error can result in complete failure of the system 100, and may go undetected for a long period of time until the regional team identifies the issue manually, resulting in a significant monitoring miss 214.

Similar to that described above with reference to FIGS. 2A-2C, the incident reporting application 118 may generate an incident report 266 that may be similar to the incident report 212, 235, and 254. Personnel of the regional team may also generate the incident report 254 manually.

The incident management application 114 may obtain the identification data 224 from the incident report 266 about the monitoring miss 214, and then use the identification data 224 to obtain incident data 226 about the outage 232 or the monitoring miss 214, for example, for the data store 120. In this case, the incident data 226 may identify the outages 262 and 264, a root cause behind the outages 262 and 264, and any co-pending alarms 234 that were active during the outages 262 and 264. A message or instruction may then be sent to the NOC to configure a rule to avoid situations that may cause another such outage 262 or 264, configure an alarm 234 along the communication path 265 or OSS 104, or send a message/recommendation to individual(s) at the NOC to suggest preventative measures going forward.

Turning now to FIG. 3, a method 300 is described. In an embodiment, method 300 may be a method for dynamically improving monitoring miss resolution in a communication system 100. Method 300 may be performed to detect and process monitoring misses in the communication system 100.

At step 303, method 300 comprises obtaining, by an incident reporting application 118 executing on a computer system in the communication system 100, an incident report (e.g., incident report 212, 235, 254, or 266) describing a monitoring miss 214. In an embodiment, the monitoring miss 214 is associated with an outage (e.g., outage 220, 222, 232, 252, 262, or 264) in the communication system 100 that was not identified or resolved during a predetermined period of time.

At step 306, method 300 comprises adding, by an incident reporting application 118 executing on a computer system in the communication system, a flag 216 to an incident report describing a monitoring miss 214. In an embodiment, the flag 216 indicates that the incident report is related to the monitoring miss 214, as opposed to another alarm sent by an NE in the system 100.

At step 309, method 300 comprises in response to determining that the incident report includes the flag 216, obtaining, by an incident management application 114 executing on the computer system, from a data store 120 communicatively coupled to the incident management application 114, an identification (e.g., identification data 224) of one or more NEs at which the outage has occurred and incident data 226 describing the outage in the communication system, to identify a cause of the monitoring miss 214 and reduce the likelihood that the monitoring miss 214 happens again in the system 100.

At step 312, method 300 comprises identifying, by the incident management application 114, a pattern of monitoring misses 214 in a monitoring miss report. The monitoring miss report may indicate a plurality of monitoring misses 214 and corresponding incident data 226 indicating a cause of each of the monitoring misses 214. In an embodiment, the monitoring misses 214 may have occurred at a plurality of different NEs in the radio access network. At step 315, method 300 comprises determining, by the incident management application 114, a single cause of the monitoring misses 214 in the pattern of monitoring misses 214 to obtain a single resolution plan, to prevent reoccurrence of each of the monitoring misses in the pattern of monitoring misses. In an embodiment, the incident management application 114 may generate a resolution plan for future monitoring misses 214 at different NEs in the RAN based on the incident data 226 of the monitoring miss 214. The resolution plan may include at least one of creating a new rule or amending an existing rule to configure the different NEs to generate an alarm when the cause of the monitoring miss (as identified in the incident data 226) is detected.

In an embodiment, method 300 may further comprise adding the incident report to the monitoring miss report, in which the monitoring miss report is traversed based on a predefined window of time, and in which the pattern of monitoring misses is based on at least one of a location of each of the monitoring misses, NEs involved in each of the monitoring misses, a vendor associated with each of the monitoring misses, a common time window or an OSS associated with each of the monitoring misses. In an embodiment, the incident data 226 comprises at least one of incident histories of the one or more NEs, a record of alarms received from the one or more NEs when the outage occurred, a status of equipment at or near the one or more NEs when the outage occurred, a maintenance history of the one or more NEs, or alarm rules associated with the one or more NEs. In an embodiment, the data store 120 may maintain a state of each of the NEs in the system 100 or RAN 102, indicating whether the NE is functioning properly or not. The incident report may be based on the state of the NE. In an embodiment, obtaining the incident report may comprise examining, by the incident reporting application 118, a plurality of manually created incident reports, determining, by the incident reporting application 118, whether the monitoring miss 214 is indicated in one of the manually created incident reports, and generating, by the incident reporting application, the incident report describing the monitoring miss 214 based on the one of the manually created incident reports. In an embodiment, the monitoring miss may occur when at least one of the following occurs: an alarm has not been configured for the outage, the monitoring miss was reported in a prior incident report but inadvertently disregarded, a misconfigured rule for the alarm, a rule was not processed correctly by an operator, the one or more NEs are in a state of maintenance, or a system failure.

Turning now to FIG. 4, a method 400 is described. In an embodiment, method 400 may be a method for dynamically improving monitoring miss resolution in a communication system 100. Method 400 may be performed to detect and process monitoring misses in the communication system 100.

At step 403, method 300 comprises obtaining, by an incident reporting application 118 executing on a computer system in the communication system 100, an incident report (e.g., incident report 212, 235, 254, or 266) describing a monitoring miss 214. In an embodiment, the monitoring miss 214 is associated with an outage (e.g., outage 220, 222, 232, 252, 262, or 264) in the communication system 100 that was not resolved during a predetermined period of time.

At step 406, method 400 comprises adding, by the incident reporting application 118, a flag 216 to the incident report. In an embodiment, the flag 216 indicates that the incident report is associated with one or more monitoring misses 214 in the communication system 100 that have not yet been resolved.

At step 409, method 400 comprises, in response to determining that the incident report includes the flag 216, extracting, by the incident management application 114, data identifying the outage (e.g., identification data 224) in the communication system 100 from the incident report. In an embodiment, the data identifying the outage comprises an identification of one or more network elements (NEs) at which the outage has occurred.

At step 412, method 400 comprises, in response to determining that the incident report includes the flag 216, obtaining, by the incident management application 114, based on the identification data 224, from a data store 120 communicatively coupled to the incident management application 114, incident data 226 describing a context of the outage in the communication system 100 to identify a cause of the monitoring miss 214 and reduce the likelihood that the monitoring miss 214 may occur again in the system 100.

In an embodiment, method 400 may further comprise generating, by the incident management application 114, a monitoring miss report comprising data from a plurality of incident reports received over a predetermined period of time, in which each of the incident reports include the flag, identifying, by the incident management application 114, a pattern of monitoring misses 214 in the monitoring miss report based on at least one of a location of each of the monitoring misses 214, NEs involved in each of the monitoring misses 214, a vendor associated with each of the monitoring misses 214, or an operational support system (OSS) associated with each of the monitoring misses 214, and determining, by the incident management application 114, a single cause of the monitoring misses 214 in the pattern of monitoring misses 214 to obtain a single resolution plan, to prevent reoccurrence of each of the monitoring misses 214 in the pattern of monitoring misses 214.

Figure 5A:
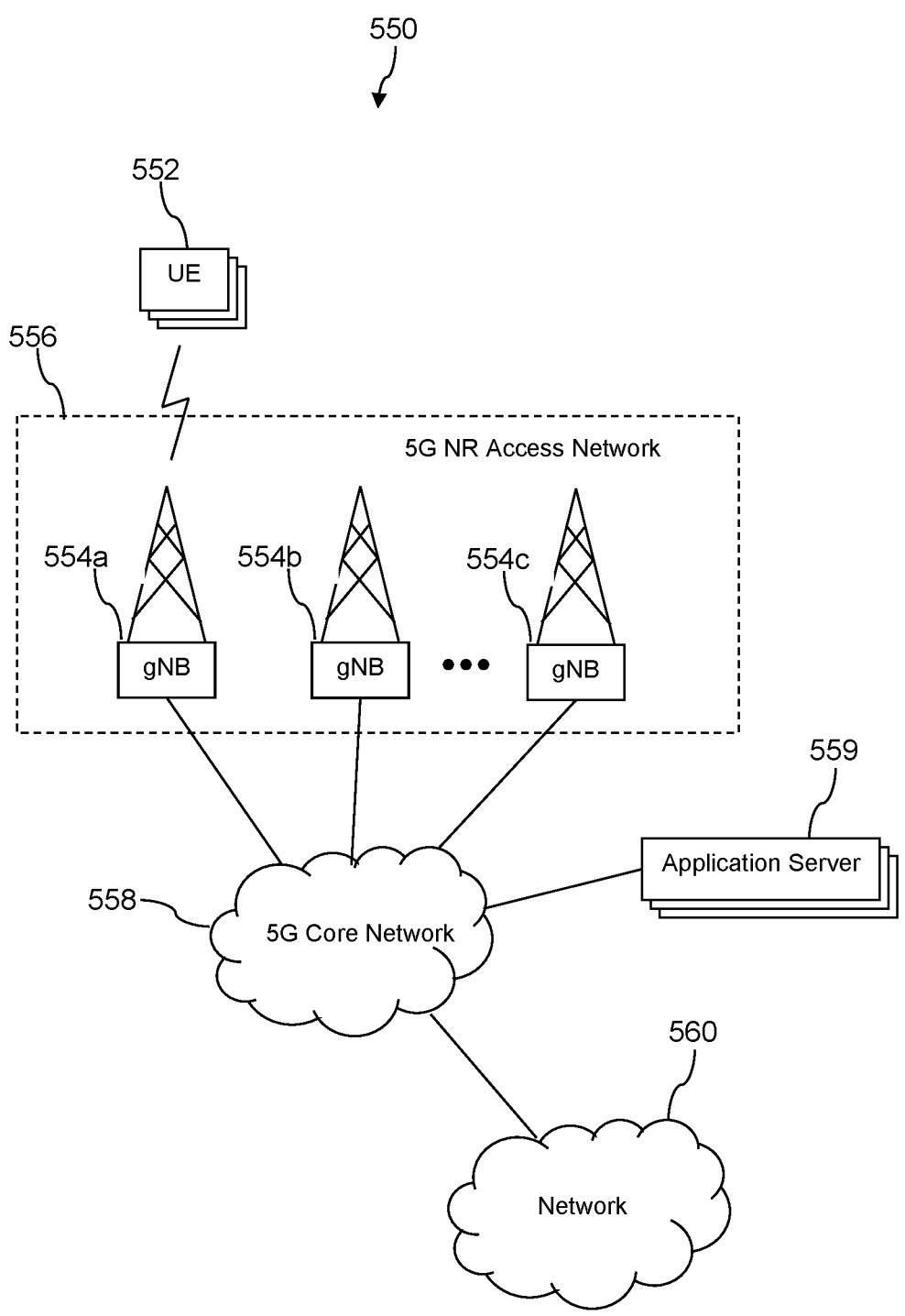
FIG. 5A and FIG. 5B are block diagrams of a 5G network according to an embodiment of the disclosure.

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
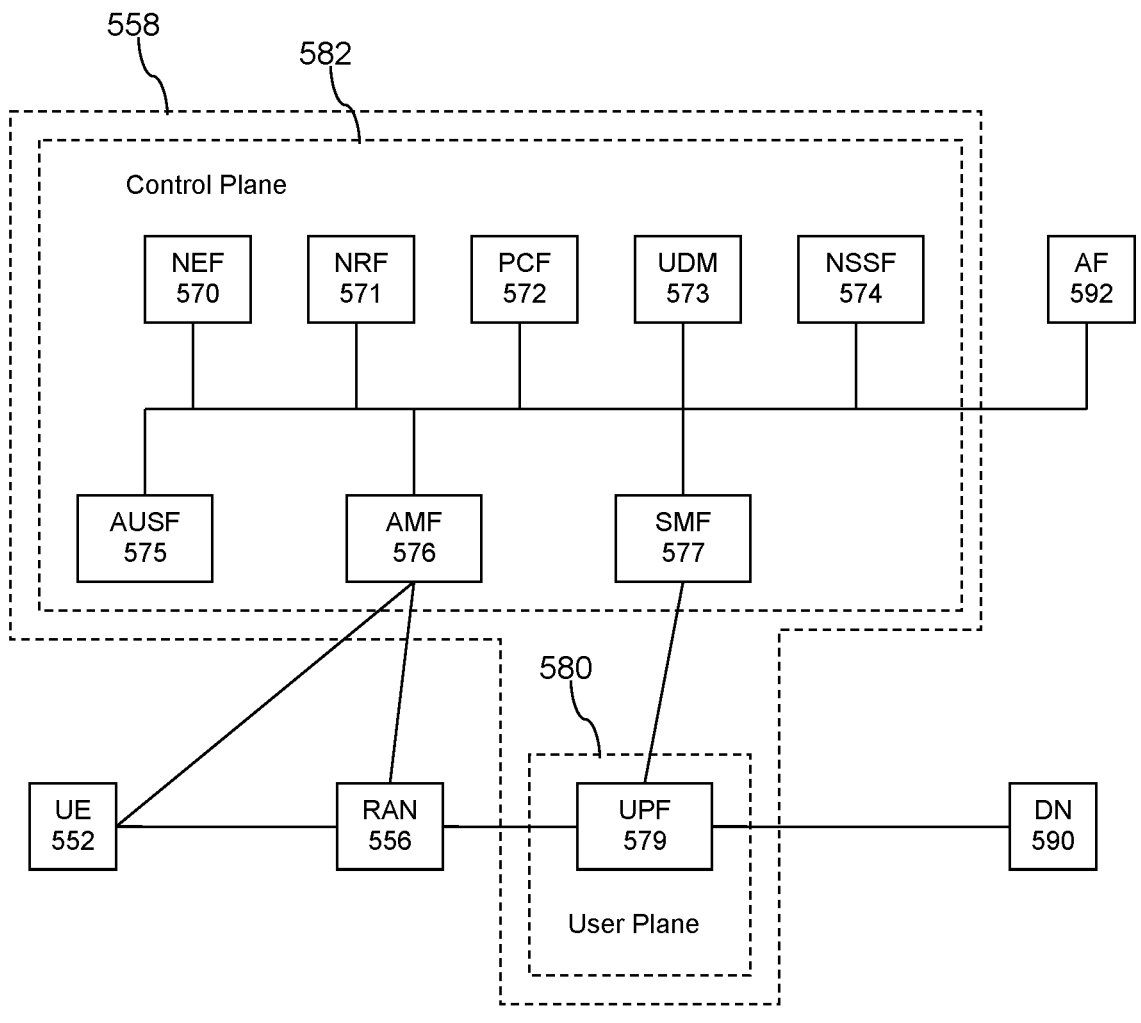

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
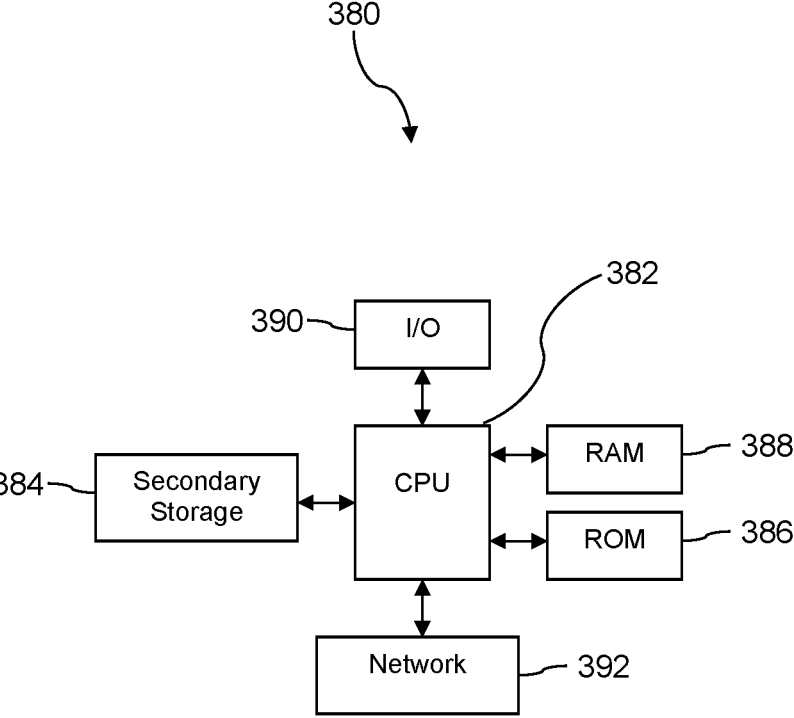
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for dynamically improving monitoring miss resolution in a telecommunications carrier network comprising a radio access network, comprising:

obtaining, by an incident reporting application executing on a computer system in the communication system, an incident report describing a monitoring miss based on at least one of a status of one or more network elements (NEs) at which an outage has occurred in the radio access network, prior incident reports associated with the one or more NEs, a record of alarms activated by the one or more NEs, or a maintenance history at the one or more NEs, wherein the monitoring miss is associated with the outage in the radio access network that has not yet been resolved;

adding, by an incident reporting application executing on a computer system in the communication system, a flag to an incident report describing a monitoring miss, wherein the flag indicates that the incident report is related to the monitoring miss;

in response to determining that the incident report includes the flag, obtaining, by an incident management application executing on the computer system, from a data store communicatively coupled to the incident management application, an identification of the one or more NEs at which the outage has occurred and incident data describing the outage in the communication system, to identify a cause of the monitoring miss;

identifying, by the incident management application, a pattern of monitoring misses in a monitoring miss report, wherein the monitoring miss report indicates a plurality of monitoring misses and corresponding incident data indicating a cause of each of the monitoring misses, and wherein the monitoring misses may have occurred at a plurality of different NEs in the radio access network; and determining, by the incident management application, a single cause of the monitoring misses in the pattern of monitoring misses to obtain a single resolution plan, to prevent reoccurrence of each of the monitoring misses in the pattern of monitoring misses.

2. The method of claim 1, further comprising adding the incident report to the monitoring miss report, wherein the monitoring miss report is traversed based on a predefined window of time, and wherein the pattern of monitoring misses is based on at least one of a location of each of the monitoring misses, NEs involved in each of the monitoring misses, a vendor associated with each of the monitoring misses, or an operational support system (OSS) associated with each of the monitoring misses.

3. The method of claim 1, wherein the incident data comprises at least one of incident histories of the one or more NEs, a record of alarms received from the one or more NEs when the outage occurred, a status of equipment at or near the one or more NEs when the outage occurred, a maintenance history of the one or more NEs, or alarm rules associated with the one or more NEs.

4. The method of claim 1, wherein the data store is configured to maintain a state of each NE in the communication system, wherein the state indicates whether each NE is functioning, and wherein the incident report is based on the state of the one or more NEs.

5. The method of claim 1, wherein the obtaining the incident report comprises:

examining, by the incident reporting application, a plurality of manually created incident reports;

determining, by the incident reporting application, whether the monitoring miss is indicated in one of the manually created incident reports; and generating, by the incident reporting application, the incident report describing the monitoring miss based on the one of the manually created incident reports.

6. The method of claim 1, wherein the monitoring miss occurs when at least one of the following occurs:

an alarm has not been configured for the outage;

the monitoring miss was reported in a prior incident report but inadvertently disregarded;

a misconfigured rule for the alarm;

a rule was not processed correctly by an operator;

the one or more NEs are in a state of maintenance; or a system failure.

7. A telecommunication network management system implemented in a telecommunications carrier network comprising a radio access network, wherein the telecommunication network management system comprises:

an incident reporting application executing on a first computer system, wherein the incident management application is configured to:

obtain an incident report describing a monitoring miss, wherein the monitoring miss is associated with an outage in the radio access network that has not yet been resolved; and add a flag to the incident report, wherein the flag indicates that the incident report is associated with one or more monitoring misses in the communication system that have not yet been resolved; and an incident management application that executes on a second computer system, wherein, when the incident report includes the flag, the incident management application is configured to:

extract identification data identifying the outage in the communication system from the incident report, wherein the identification data comprises an identification of one or more network elements (NEs) at which the outage has occurred;

obtain, from a data store communicatively coupled to the incident management application, based on the identification data, incident data describing the outage and identifying a cause of the monitoring miss; and generate a resolution plan for future monitoring misses at different NEs in the radio access network based on the incident data of the monitoring miss, wherein the resolution plan comprises at least one of creating a new rule or amending an existing rule to configure the different NEs to generate an alarm when the cause of the monitoring miss is detected.

8. The system of claim 7, wherein the incident management application is further configured to:

generate a monitoring miss report comprising data from a plurality of incident reports received over a predetermined period of time, wherein each of the incident reports include the flag;

identify a pattern of monitoring misses in the monitoring miss report based on at least one of a location of each of the monitoring misses, NEs involved in each of the monitoring misses, a vendor associated with each of the monitoring misses, or an operational support system (OSS) associated with each of the monitoring misses; and determine a single cause of the monitoring misses in the pattern of monitoring misses to obtain the resolution plan, to prevent reoccurrence of each of the monitoring misses in the pattern of monitoring misses.

9. The system of claim 7, wherein the incident data comprises at least one of incident histories of the one or more NEs, a record of alarms received from the one or more NEs when the outage occurred, a status of equipment at or near the one or more NEs when the outage occurred, a maintenance history of the one or more NEs, or alarm rules associated with the one or more NEs.

10. The system of claim 7, wherein the incident report is generated based on an indication in a data store that the one or more NEs are not functioning.

11. The system of claim 9, wherein the incident reporting application is further configured to:

examine a plurality of manually created incident reports;

determine whether the monitoring miss is indicated in one of the manually created incident reports; and generate the incident report describing the monitoring miss based on the one of the manually created incident reports.

12. The system of claim 7, wherein the monitoring miss occurs when at least one of the following occurs:

an alarm has not been configured for the outage;

the monitoring miss was reported in a prior incident report but inadvertently disregarded;

a misconfigured rule for the alarm;

a rule was not processed correctly by an operator;

the one or more NEs are in a state of maintenance; or a system failure.

13. The system of claim 7, wherein the incident reporting application is further configured to:

add the incident report to a monitoring miss report; and traverse the monitoring miss report periodically according to a predetermined schedule to identify a pattern of monitoring misses that is resolvable with the resolution plan.

14. A method for dynamically improving monitoring miss resolution in a telecommunications carrier network comprising a radio access network, wherein the method comprises:

obtaining, by an incident reporting application executing on a computer system in the communication system, an incident report describing a monitoring miss, wherein the monitoring miss is associated with an outage in the radio access network that has not yet been resolved;

adding, by the incident reporting application, a flag to the incident report, wherein the flag indicates that the incident report is associated with one or more monitoring misses in the communication system that have not yet been resolved;

in response to determining that the incident report includes the flag:

extracting, by an incident management application executing on the computer system, identification data identifying the outage in the communication system from the incident report, wherein the identification data comprises an identification of one or more network elements (NEs) at which the outage has occurred; and obtaining, by the incident management application, based on the identification data, from a data store communicatively coupled to the incident management application, incident data describing a context of the outage in the communication system to identify a cause of the monitoring miss.

15. The method of claim 14, further comprising generating, by the incident management application, a monitoring miss report comprising data from a plurality of incident reports received over a predetermined period of time, wherein each of the incident reports include the flag;

identifying, by the incident management application, a pattern of monitoring misses in the monitoring miss report based on at least one of a location of each of the monitoring misses, NEs involved in each of the monitoring misses, a vendor associated with each of the monitoring misses, or an operational support system (OSS) associated with each of the monitoring misses; and determining, by the incident management application, a single cause of the monitoring misses in the pattern of monitoring misses to obtain a single resolution plan, to prevent reoccurrence of each of the monitoring misses in the pattern of monitoring misses.

16. The method of claim 14, wherein the incident data comprises at least one of incident histories of the one or more NEs, a record of alarms received from the one or more NEs when the outage occurred, a status of equipment at or near the one or more NEs when the outage occurred, a maintenance history of the one or more NEs, or alarm rules associated with the one or more NEs.

17. The method of claim 14, wherein the data store is configured to maintain a state of each NE in the communication system, wherein the state indicates whether each NE is functioning, and wherein the incident report is based on the state of the one or more NEs.

18. The method of claim 14, wherein the obtaining the incident report comprises:

examining, by the incident reporting application, a plurality of manually created incident reports;

determining, by the incident reporting application, whether the monitoring miss is indicated in one of the manually created incident reports; and generating, by the incident reporting application, the incident report describing the monitoring miss based on the one of the manually created incident reports.

19. The method of claim 14, wherein the monitoring miss occurs when at least one of the following occurs:

an alarm has not been configured for the outage;

the monitoring miss was reported in a prior incident report but inadvertently disregarded;

a misconfigured rule for the alarm;

a rule was not processed correctly by an operator;

the one or more NEs are in a state of maintenance; or a system failure.

20. The method of claim 14, further comprising:

adding, by the incident reporting application, the incident report to a monitoring miss report; and traverse, by the incident reporting application, the monitoring miss report periodically according to a predetermined schedule to identify a pattern of monitoring misses that is resolvable with a single resolution plan.

\* \* \* \* \*